United States Patent
Delgado Matarranz et al.

(10) Patent No.: US 8,506,218 B2
(45) Date of Patent: Aug. 13, 2013

(54) TRANSPORTING TOOL FOR TOWER SECTIONS OF A WIND TURBINE

(75) Inventors: Cristina Delgado Matarranz, Sarriguren (ES); Diego Rueda Alzugaray, Sarriguren (ES); Jesús Urbiola Martínez, Sarriguren (ES)

(73) Assignee: Gamesa Innovation & Technolgy, S.L., Sarriguren (ES)

( * ) Notice: Subject to any disclaimer, the term of this patent is extended or adjusted under 35 U.S.C. 154(b) by 83 days.

(21) Appl. No.: 13/140,873

(22) PCT Filed: Dec. 15, 2009

(86) PCT No.: PCT/ES2009/070589
§ 371 (c)(1),
(2), (4) Date: Jun. 20, 2011

(87) PCT Pub. No.: WO2010/070178
PCT Pub. Date: Jun. 24, 2010

(65) Prior Publication Data
US 2011/0255934 A1 Oct. 20, 2011

(30) Foreign Application Priority Data
Dec. 19, 2008 (ES) .................................. 200803624

(51) Int. Cl.
*B60P 7/08* (2006.01)
(52) U.S. Cl.
USPC .................. 410/44; 410/47; 410/49; 410/34; 410/42
(58) Field of Classification Search
USPC ................. 410/32, 34, 35, 36, 42, 44, 46, 47, 410/48, 49, 50; 206/389, 443, 446; 280/404; 211/85.18; 248/68.1
See application file for complete search history.

(56) References Cited

U.S. PATENT DOCUMENTS
7,303,365 B2 12/2007 Wobben
7,704,024 B2 * 4/2010 Kootstra et al. ................. 410/44

FOREIGN PATENT DOCUMENTS

| | | |
|---|---|---|
| DE | 37 02 792 A1 | 8/1988 |
| EP | 0 253 116 A2 | 1/1988 |
| EP | 0 736 427 B1 | 3/1998 |
| EP | 0 919 666 B1 | 6/1999 |
| EP | 1 465 789 A1 | 10/2004 |
| EP | 1849719 A1 | 10/2007 |
| ES | 2 113 171 T3 | 4/1998 |
| ES | 2 181 146 T3 | 2/2003 |
| ES | 2 317 715 A1 | 4/2009 |
| GB | 2 104 482 A | 3/1983 |
| WO | 97/29978 A1 | 8/1997 |
| WO | 2007/093854 A2 | 8/2007 |

OTHER PUBLICATIONS espacenet English abstract of ES 2 181 146 T3.
espacenet English abstract of ES 2 113 171 T3.
espacenet English abstract of DE 37 02 792 A1.
espacenet English abstract of EP 1 465 789 A1.
espacenet English abstract of EP 0 919 666 B1.

* cited by examiner

*Primary Examiner* — Stephen Gordon
(74) *Attorney, Agent, or Firm* — Ladas & Parry LLP

(57) ABSTRACT

A transporting tool for tower transporting sections of wind turbine tower by railway, road and sea transport vehicles that includes a lower module, with bottom clamps and an upper module, with upper clamps, chocks mounted to the tower module, and fastening elements that combined allow anchoring the tower section, for transport.

9 Claims, 8 Drawing Sheets

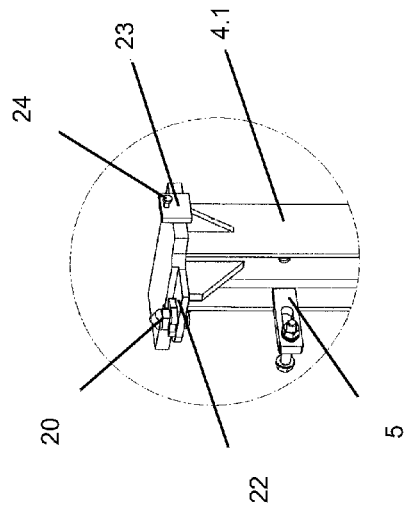
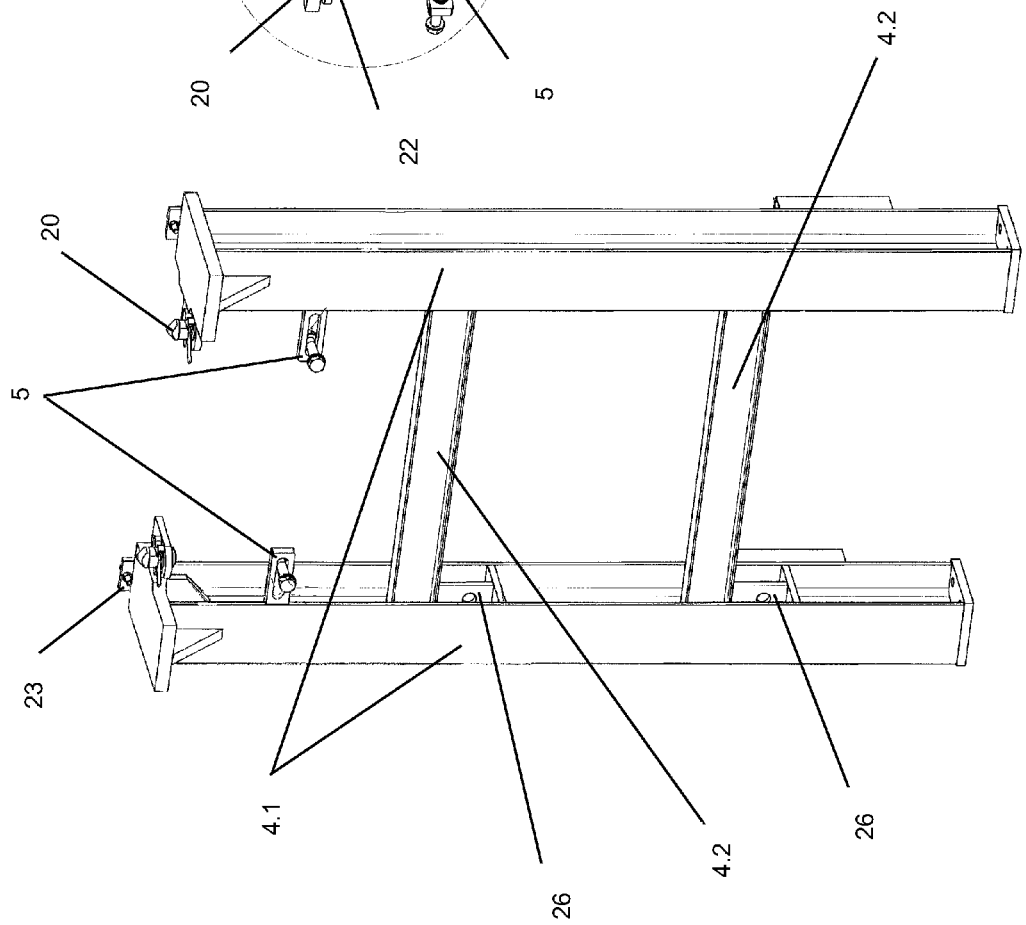

TRANSPORTING TOOL FOR TOWER SECTIONS OF A WIND TURBINE

OBJECT OF THE INVENTION

This invention is related to the transport of sections of wind turbine towers and more specifically to a universal and interchangeable transport tool for tower sections that allows transporting the tower by any means, whether by road, railway or sea, and the transport of any type of tower section regardless of its configuration.

BACKGROUND OF THE INVENTION

Different tool solutions are known for transporting wind turbine tower sections, almost all based on chocks Chocks are a very important element for the stable and safe fastening of the wind turbine tower sections during their movement or storage and therefore, it is difficult for substantial innovations to them, with the introduction of wind turbines and increased transport of large elements, including tower sections, a fresh boost to the research and use of fixing and fastening elements designed for transport and storage has been achieved.

The inventions either related to chocks or the same basis of the support tool for the transport of the wind turbine tower sections show both the age of these elements and the countless uses they have and as can be seen in ES2181146 patent, that show a railway crossbeam based on the principle of two shoes with a metal joint between them; ES2113171 patent in which a chock for industrial vehicles is described; DE3702792, EP0253116, GB2104482, U.S. Pat. No. 6,302,291 and WO09729978 inventions concerning metal containers for cylindrical tanks and their transport and finally the EP1465789 patent that shows tools for transporting wind turbine elements. But in no event are these inventions similar to the tool that is the object of this invention.

The applicant initially developed a support tool based on a metal square in which the base of the support was supported on the transport vehicle and the vertical plate was screwed to two of the anchoring holes of the ring with the rest of the tower sections.

This support tool badly damaged the tower structure, since all the weight of the tower section fell on the four holes (two on each side of the section) where the support tool was anchored and due to this and accelerations and inertial forces caused during transport, occasionally distorted the holes of the clamps and even distortions were registered in the section rings themselves, making subsequent assembly of the tower in the field more difficult.

As a result of the effects produced by the initially developed support, another tool was developed in which the loads were transmitted to a wooden support and the structure was fixed by four different points to a vertical metal plate, so that the holes on the tower section on which the tool was screwed hardly supported the forces, as both the weight and the accelerations fell on the wooden supports. This invention is included in the P200500915 patent application.

Another important factor in large-sized part transport is the means of transport chosen, as depending on what measure is used, different transport needs are foreseen.

Wind turbine transport is carried out either by road, railway or by sea. In road and railway transport the tower sections are consecutively placed on the different support tools, while in sea transport the sections are piled on top of others so that the space is made better use of.

Given that currently known solutions do not provide a transport tool that allows transporting any type of tower section by any means of transport, different types of tools are used depending on the section of tower to be transported and depending on the means of transport used.

DESCRIPTION OF THE INVENTION

According to this invention, a tool is proposed for transporting towers that thanks to its constructive characteristics is extremely advantageous compared to conventional solutions, providing an interchangeable tool which is universal at the same time that guarantees the safe transport of any kind of tower section by any means of transport.

The transport tool object of the invention solves the problems of distortions in the transported sections and, given its modular design, allows transporting different types of sections, and may be adapted to the needs of any means of transport.

This transport tool consists of a balancing tool, some modules, some upper and lower clamps, some chocks and fastening elements.

The transport tool defines two types of different modules that from now on will be called A module and B module.

The A module is the element for connecting the tool to the section to be transported and consists of a plate with welded structural profiles that contains a clamp with a height adjustment system to be adapted to the different types of tower sections to be transported.

The B module consists of structural profiles connected by screwed joints to the A module and is used to lift sections for sea transport, where an A module with its corresponding section is fixed by fastening elements.

The amount of modules used to transport sections depends on the type of transport being carried out. Thus, to transport sections by road or railway two 1 modules are used while two extra 2 modules are used for sea transport with raised sections.

To place a section in the A module, it is necessary to use a balancing tool that is placed underneath the A module, levelling it to obtain a good horizontality. This balancing tool is made up by some centring devices or positioners, some claw supports, an adjusting screw and a balancing roller.

To fasten the sections to the 1 and 2 modules, the transport tool has some clamps that determine a different configuration depending on its location. In this way, the upper clamp determines a mounting hole for fixing to the section with screwed joints and a recess to position it with its inner side resting on the edge of the profile of the B module, while the lower clamp determines a hole for fixing the section with screwed joints, a recess for resting it on the clamp of the A module height adjustment system and some positioning chamfers.

The sections, as well as being fastened to the modules by the clamps, rest on some chocks that have a layer of polymer material, such as Teflon for example, to protect the section. These chocks are placed on the A module with some screwed pins that are inserted into some holes in the module, determining two different positions: inner and outer depending on the type of section to be transported.

On the other hand, the transport tool has some fastening elements such as fastening chains, twistlocks and fixing strips, that are used to both connect the different modules and fasten the transport tool and section assembly onto the means of transport, whether it be by railway, road or sea.

BRIEF DESCRIPTION OF THE FIGURES

FIG. 5A shows a perspective of the B module of the transport tool for towers of the invention.

FIG. 5B is a detailed perspective of the upper part of the B module of the invention.

DESCRIPTION OF A PREFERRED EMBODIMENT

Figure 1:
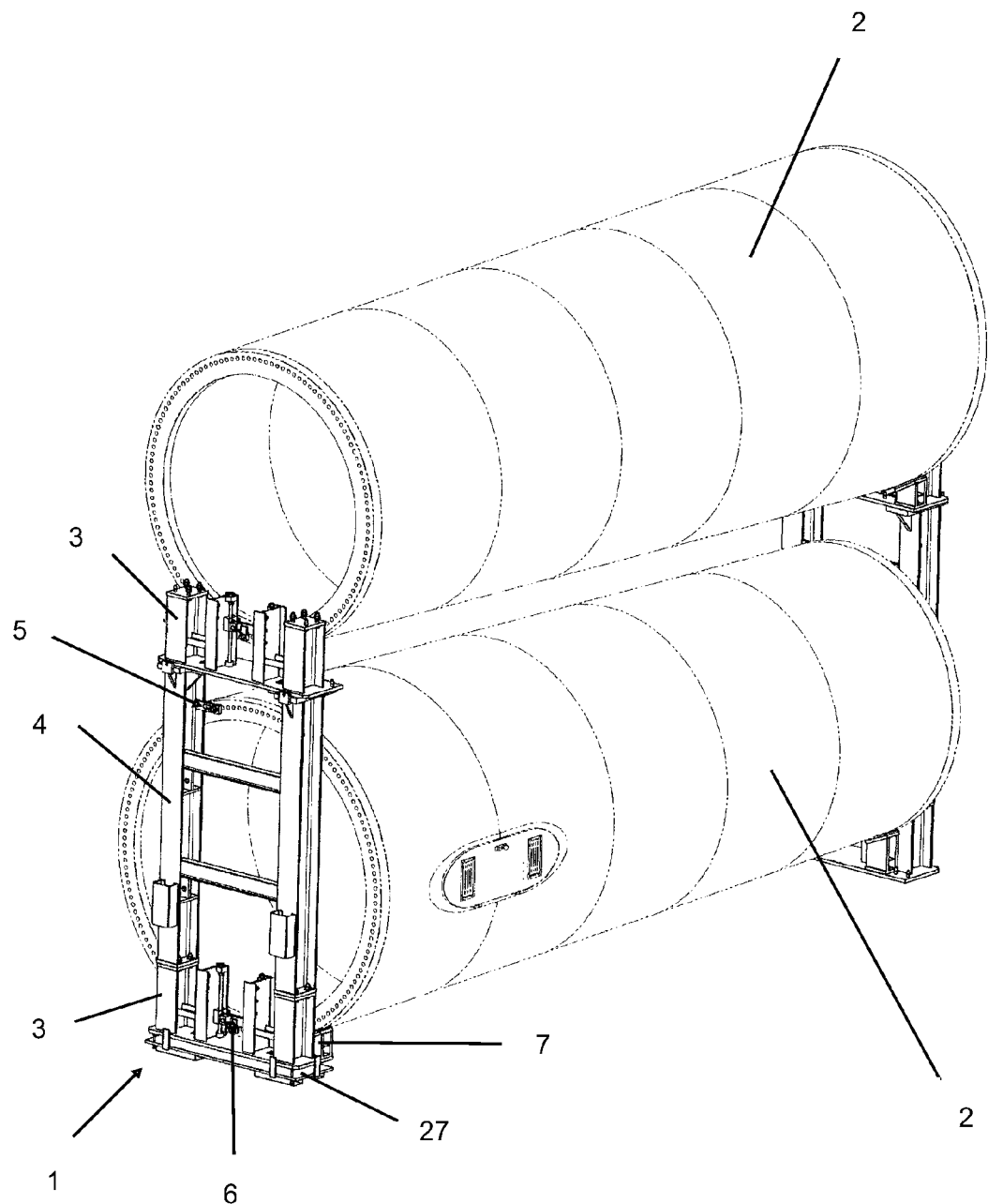
FIG. 1 shows a perspective of lifting tower sections according to the invention.

As shown in FIG. 1, the transport tool (1) of the sections (2) of a wind turbine tower, object of this invention, supports the load of the tower section preventing the weight, as well as accelerations and inertial forces caused during transport damaging the structure of the sections and thus is made up of some modules (3 and 4), some upper (5) and lower (6) clamps, some chocks (7) and fastening elements (20, 33), not detailed in this figure, between modules and to the means of transport.

The transport tool (1) defines two types of different modules (3 and 4), that from now on will be called A module (3) and B module (4), for use in tower section (2) transport by road, railway or ship.

The amount of modules (3 and 4) used to transport sections (2) depends on the type of transport being carried out. Thus, to transport sections by road or railway two 1 modules are used while two extra 2 modules are used for sea transport with raised sections.

Figure 2:
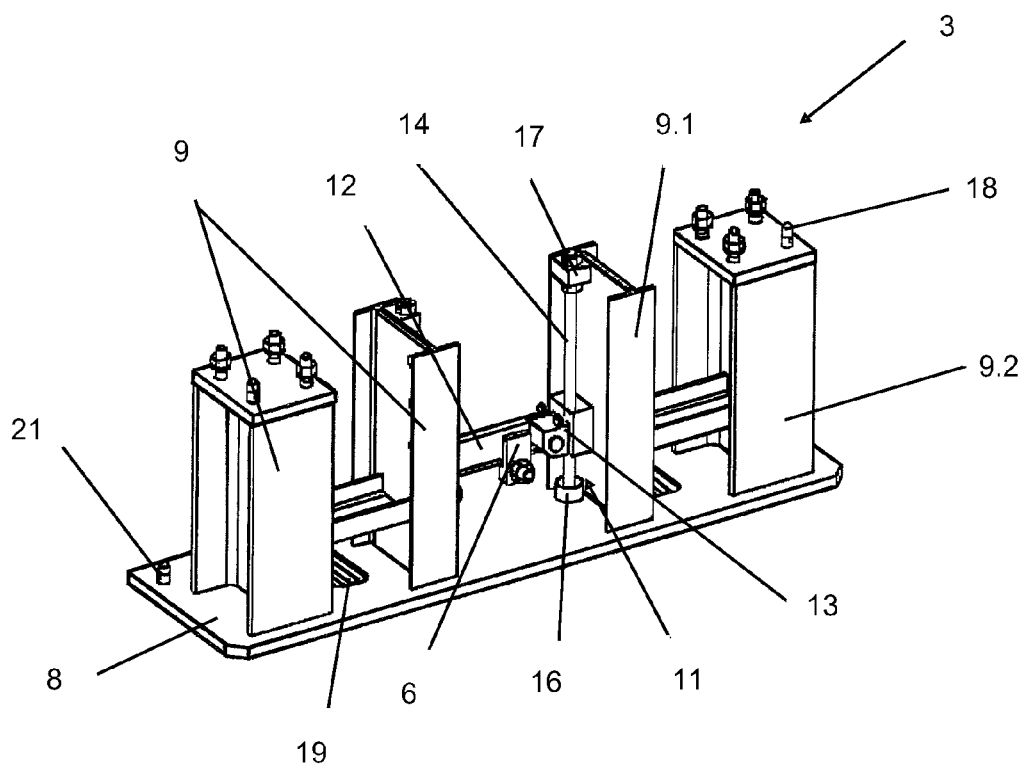
FIG. 2 shows a perspective of the tool component A module for tower transport.
Figure 3:
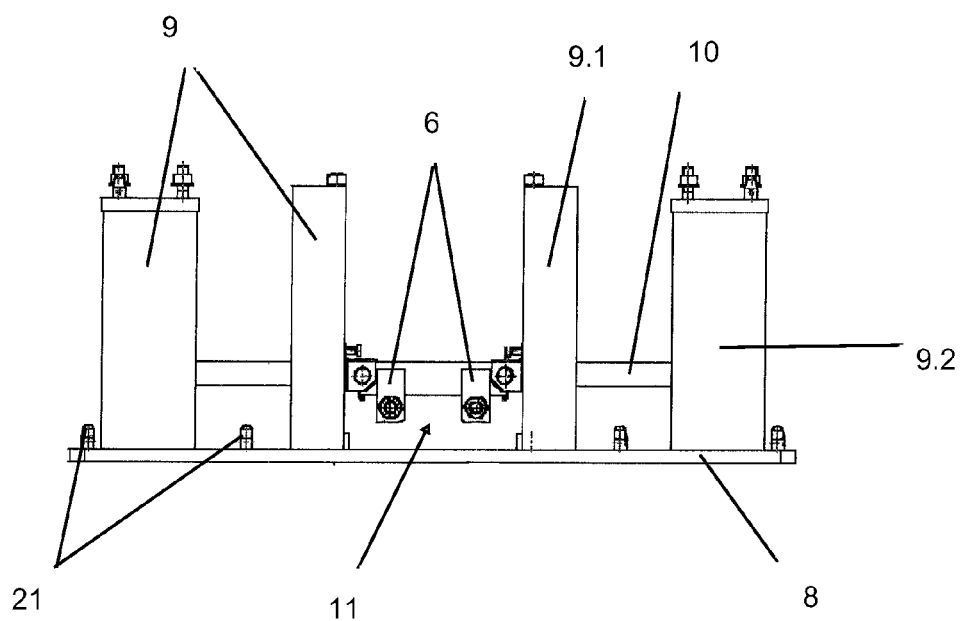
FIG. 3 is an elevated view of the A module of the tool of the invention.

The A module (see FIGS. 2 and 3) constitutes the connection element of the tool (1) to the section (2) to be transported and consists of a plate (8) with inner (9.1) and outer (9.2) welded structural profiles (9) that are joined together with some transport profiles (10). On the other hand, the module (3) has a moving system (11) that allows adjusting the height of a clamp (12) to adjust each type of section (2).

Figure 4:
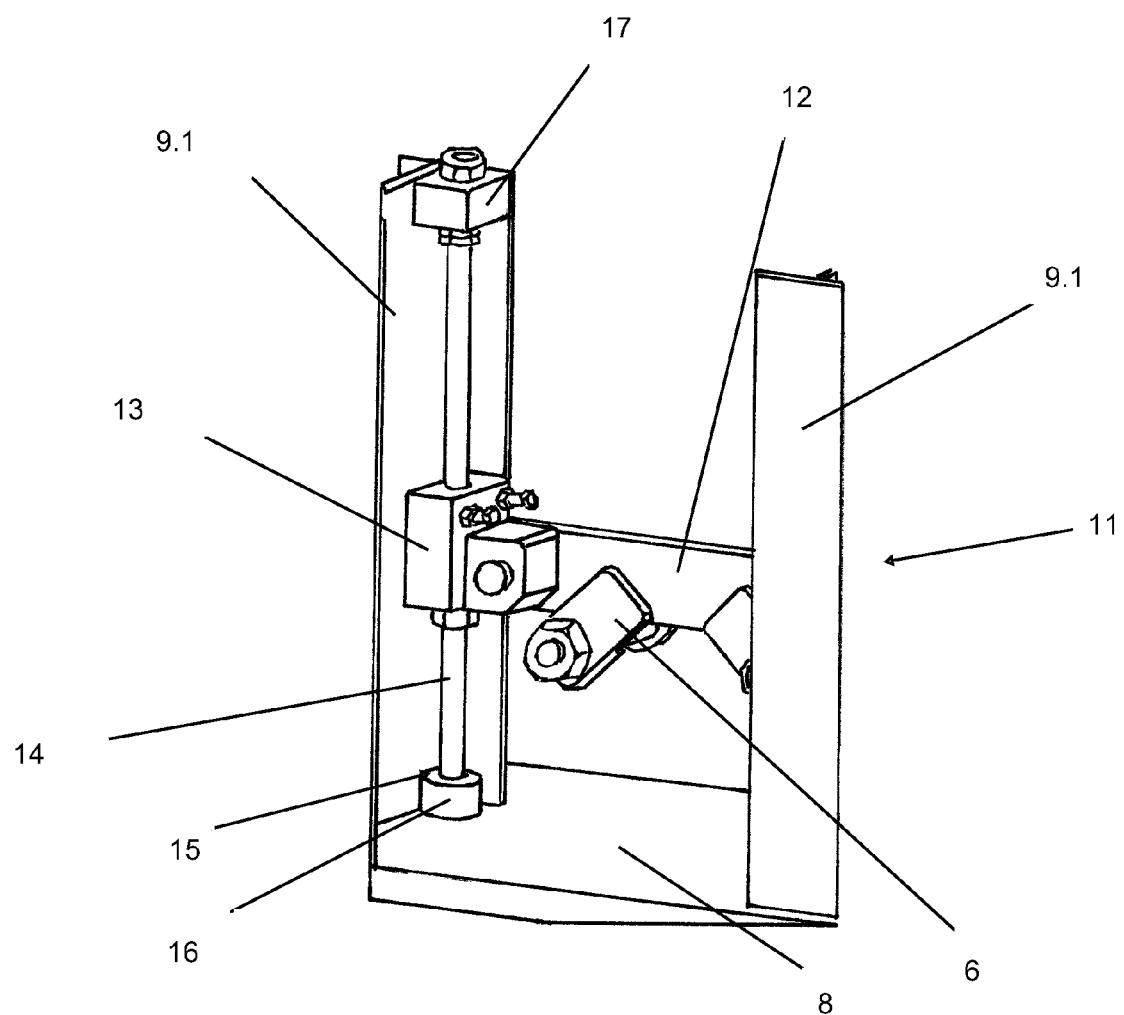
FIG. 4 shows the height adjustment system of the A module of the tool of the invention.

The adjustment system (11) shown in FIG. 4, is positioned between the inner profiles (9.1) of the A module and determines a height adjustable clamp (12) that is connected at its two ends to two lugs (13) inserted in two threaded rods (14), which on the one hand are rested by a part made out of polymer material (15), such as Teflon, on a bushing (16) welded onto the A module (3) and on the other are screwed to some entering parts (17) of the inner profiles (9.1) of this module (3).

On the other hand, this A module determines on the upper part of the outer profiles (9.2) some holes for inserting some centring pins (18) for the coupling of the B module, while the plate (8) has some holes (19) for inserting some fastening elements (20) in the B module, such as twistlocks and some pins (21) to position some chocks (7) to support the transported sections (2).

Figure 7:
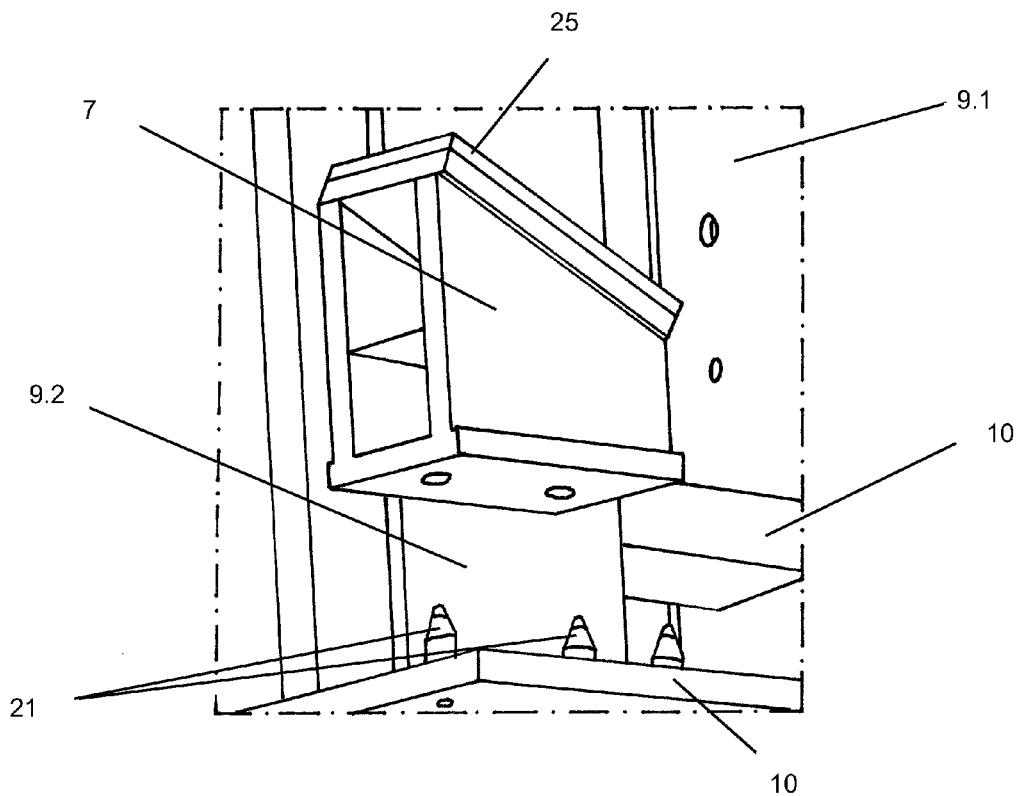
FIG. 7 is a detail in perspective of the assembly of a chock on the A module.
Figure 8:
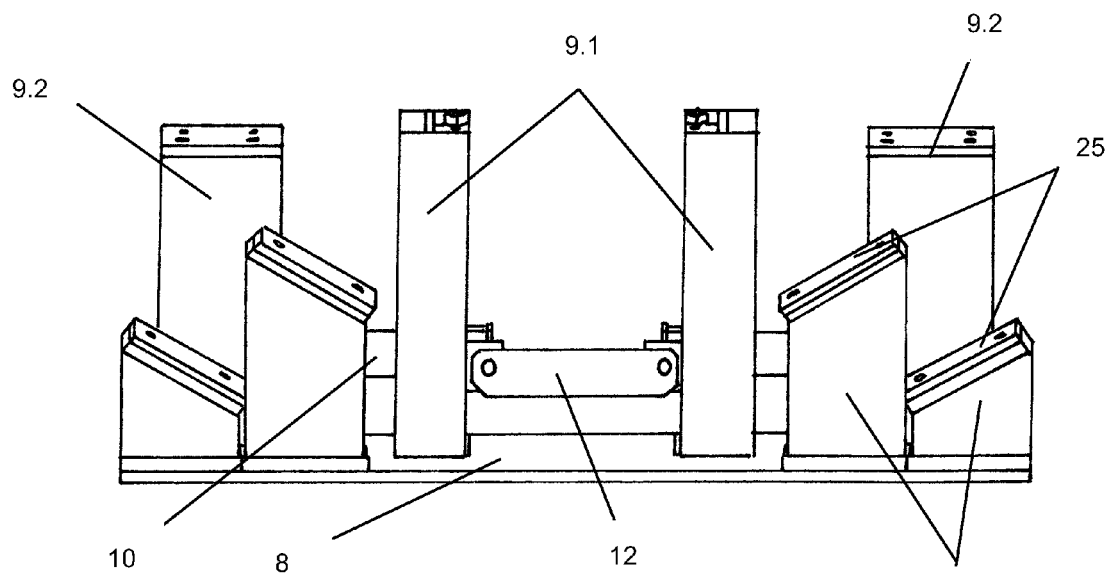
FIG. 8 shows a perspective of the A module positioned on chocks in different positions.

These chocks (7) may be placed in two positions determined by the pins (21) of the A module (3) which are one outer and one inner pin (see FIG. 8) and have a layer of polymer material (25), Teflon, on which the transported section (2) will rest (see FIG. 7).

The B module (4) consists of connected structural profiles, determining two longitudinal profiles (4.1) and at least one transversal profile (4.2) (see FIG. 5A) and is used to lift sections for sea transport. To do so, the A module is fixed with fastening elements (20) such as twistlocks for example.

This module (4), as shown in FIG. 5B, on the upper part determines some housings (22) to incorporate the fastening elements (20), that will be inserted in an A module (3) placed on this B module (4) for anchoring the lifted section (2), and on the other hand determines some side tabs (23) equipped with nuts and bolts elements (24) that prevent the longitudinal movements of the lifted (2) section and finally on the longitudinal profiles (4.1) it determines some fastening lugs (26) to fasten the entire assembly, transport tool (1) and sections (2), to the means of transport.

Figure 6A:
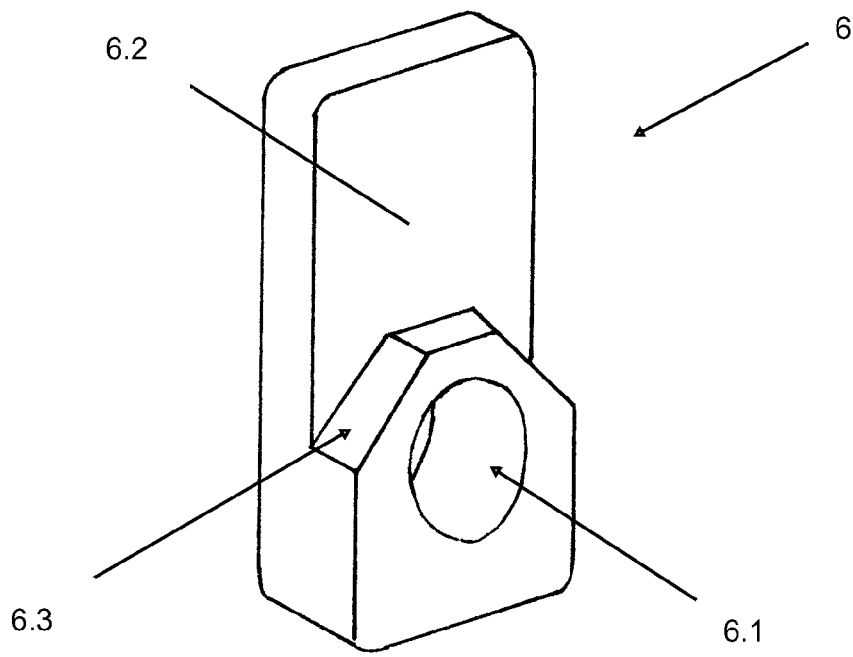
FIGS. 6A and 6B show two clamp embodiments for positioning on the lower and upper part respectively.
Figure 6B:
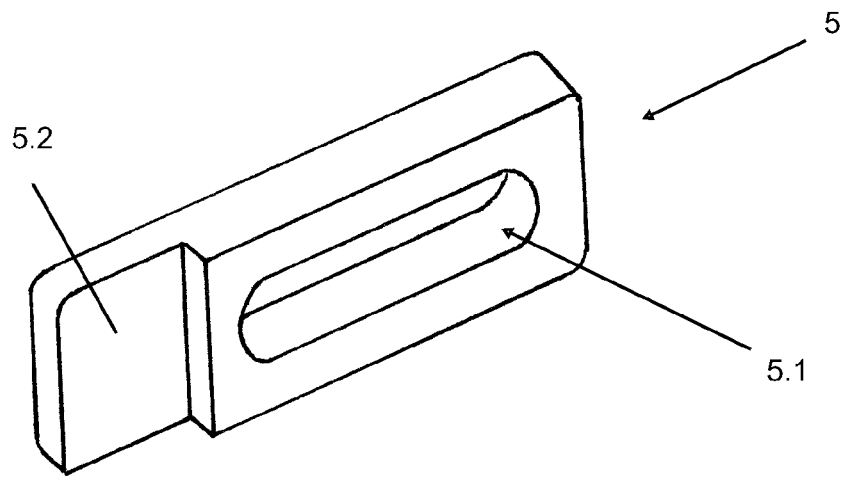

On their part, the clamps (5 and 6), see FIGS. 6B and 6A respectively, present a different configuration according to their location, so that the upper clamp (5) determines a mounting hole (5.1) to fasten it to the section (2) with screwed joints and a recess (5.2) to position it with is inner side rested on the edge of the profile (4.1) of the B module, while the lower clamps (6) determines a hole (6.1) for fastening the section (2) with screwed joints, a recess (6.2) to rest it on the clamp (12) of the A module height adjustment system (11) and some positioning chamfers (6.3).

Figure 9:
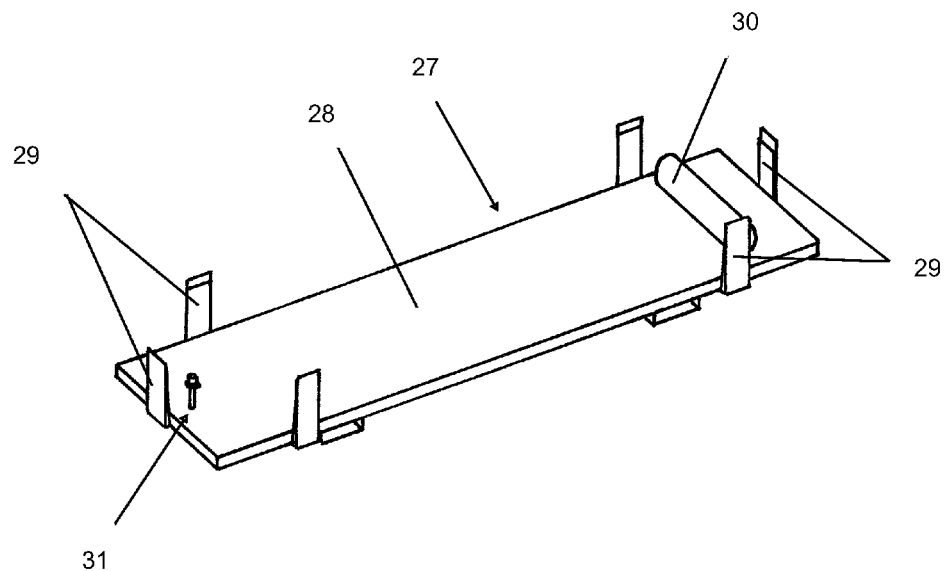
FIG. 9 shows a perspective of the balancing tool of the transport tool of the invention.
Figure 10:
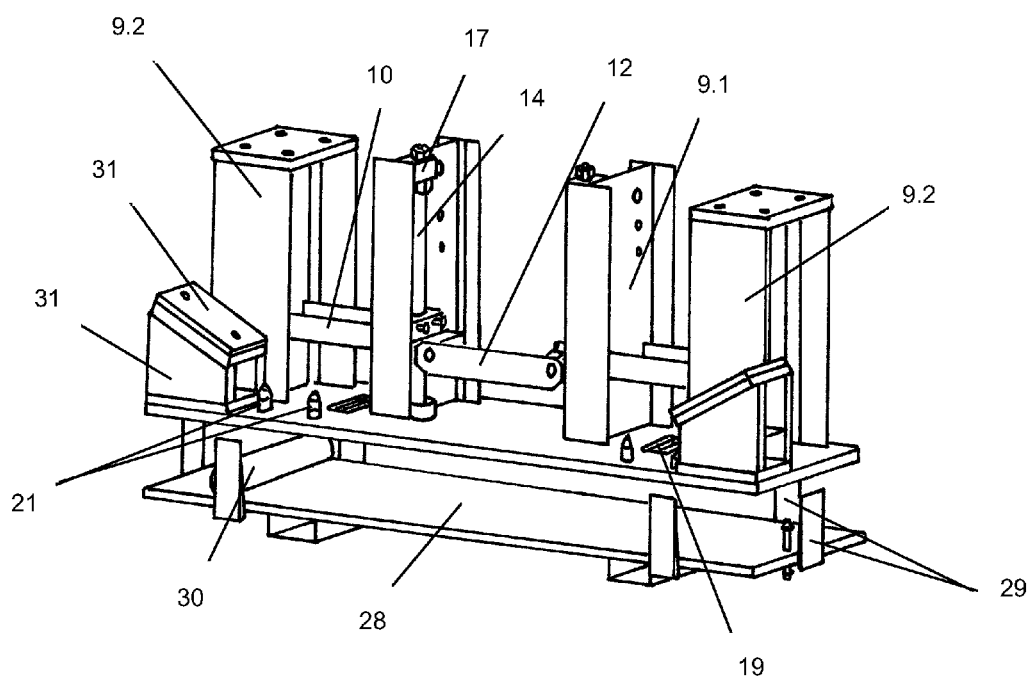
FIG. 10 shows a perspective of the layout of the transport tool underneath the A module.

To assemble the A module on the section (2) of tower to be transported it is necessary to balance this module (3) during its positioning on the section (2) (see FIG. 10). To do so, a balancing tool (27) is used as shown in FIG. 9, that is placed underneath the A module that is made up of a base plate (28) with some centring devices (29) and that has a balancing tube (30) and an adjusting screw (31) with a ball and socket foot. In this way, the edge of the clamp (32) of the section to be transported will be correctly rested on the chocks (7) placed on this A module.

Figure 11:
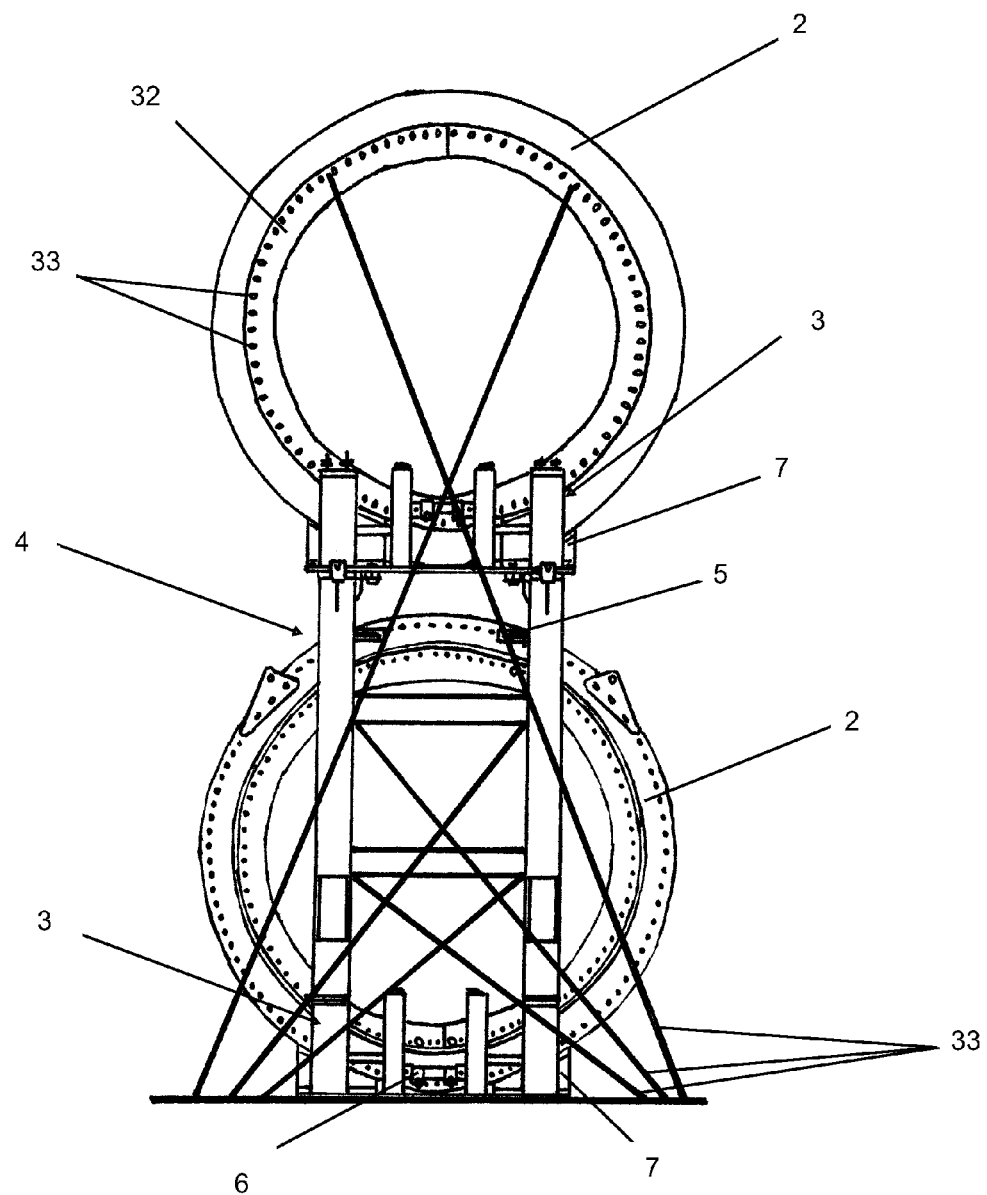
FIG. 11 shows a fastening embodiment example of sections lifted with the transport tool of the invention.

The transport tool (1) and section (2) assembly is anchored to the means of transport, as shown in FIG. 11, with fastening elements, such as fastening chains (33), twistlocks (20) or any other similar element, ensuring anchoring with metal strips (not shown).

The invention claimed is:

1. A transporting tool for tower sections of a wind turbine tower, for road, railway and sea transport means, the transporting tool including modular parts made up by modules with upper clamps and bottom clamps to be fixed to a flange of a tower section to be transported, chocks, and fastening elements that combined allow anchoring the tower section to a transport means, the modules comprising a lower module and an upper module, the bottom clamps and the chocks being mounted to the lower module, the upper module comprising the fastening elements for fastening the upper module to a further lower module to be placed on the upper module for anchoring a further tower section in a lifted position, the lower module and the further lower module being identical, wherein the upper clamps are mounted to the upper module;

the lower module is made up of a plate with inner structural profiles and outer structural profiles welded to the plate and joined together by transport profiles;

a height adjustment system is positioned between the inner structural profiles and comprises a height adjustable clamp;

the bottom clamps are mounted to the height adjustable clamp; and said plate of the lower module has parts for incorporating the fastening elements of the upper module.

2. The transporting tool according to claim 1, comprising a balancing tool for use when assembling the tower section on the lower module placed underneath the lower module.

3. The transporting tool, according to claim 1, wherein the upper module, when used for placing the further lower module on the upper module for anchoring the further tower section for sea transport, is made of joined structural profiles comprising two longitudinal profiles joined by at least one transversal profile, the longitudinal profiles having respective upper parts having a housing incorporating one of the fastening elements for fastening the upper module to said further lower module and side tab equipped with a nut and bolt element, the longitudinal profiles further comprising respective fastening lugs to fix the transporting tool which comprises the upper module and the lower module on which the upper module is placed as an entire assembly and the tower sections, to the transport means.

4. The transporting tool according to claim 2, wherein the balancing tool is made up of a base plate with centring devices, a balancing tube and an adjusting screw with a ball and socket foot.

5. The transporting tool according to claim 1, wherein the chocks have a layer of polymer material to support the sections of tower to be transported.

6. The transporting tool according to claim 1, wherein the height adjustable clamp has two ends each connected to a lug inserted on a threaded rod, which on the one end rests on a part made of polymer material in a bushing on said plate of the lower module and, on the other end, is screwed to entry parts of the inner profiles of the lower module.

7. The transporting tool according to claim 1, wherein each of the bottom clamps has a hole for fixing the flange of the tower section by screwed joints, a recess to support the bottom clamp at the height adjustable clamp of the height adjustment system, and positioning chamfers.

8. The transporting tool according to claim 1, wherein each of the upper clamps has a mounting hole to fix it to the flange of the tower section (2) with by screwing and a recess to position an upper clamp resting on the an inner side of an edge of a longitudinal profile of the upper module.

9. The transporting tool according to claim 1, wherein the plate (8) of the lower module has holes (19) for threading pins (21) to couple each of the chocks (7) in two positions.

* * * * *